June 2, 1953 J. SPON 2,640,262
PIVOT FOR SHEARS
Filed March 8, 1946
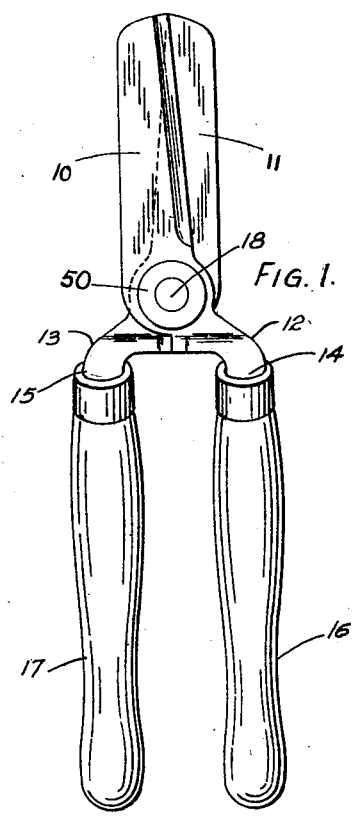
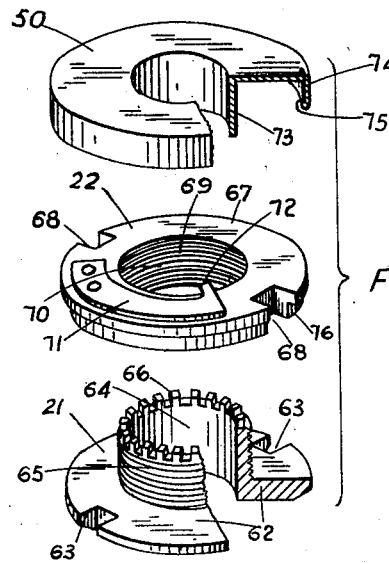
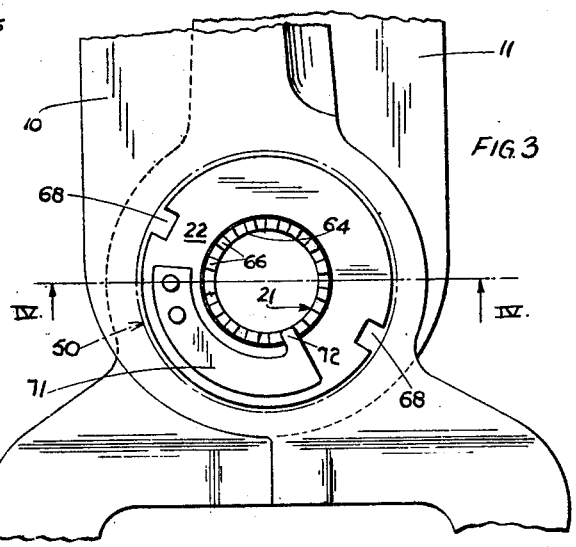
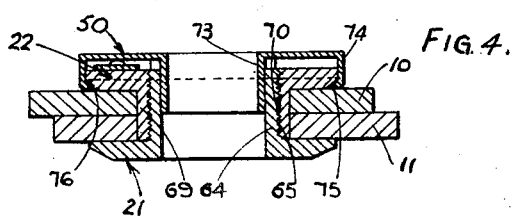
INVENTOR:
JOHN SPON
BY:
ATTORNEY Patented June 2, 1953

2,640,262

UNITED STATES PATENT OFFICE 2,640,262

PIVOT FOR SHEARS

John Spon, London, England

Application March 8, 1946, Serial No. 653,024
In Great Britain March 13, 1945

1 Claim. (Cl. 30—270)

This invention relates to cutting tools of the class comprising garden shears, scissors and secateurs, having two cutting blades formed as arms of a pair of levers pivotally connected together by a fulcrum joint and adapted to be operated by actuating the other pair of arms of the levers which may themselves form handles, as in the case of scissors or secateurs, or may be formed as tangs to be engaged in handles, as in the case of garden shears.

It is an object of the invention to provide a well balanced cutting tool of the class referred to capable of quick and efficient operation without undue fatigue to the operator.

A further object of the invention is to provide a cutting tool of the class described having a novel fulcrum for the pivotally connected blades thereof.

According to the invention there is provided a cutting tool of the class described comprising a pair of cutting blades and a floating fulcrum therefor including two relatively adjustable parts, each part carrying an element of a ratchet locking device adapted to cooperate to lock the two parts in an adjusted position.

The invention is illustrated by way of example in the accompanying drawings, in which:

Figure 1 illustrates a pair of garden shears having a fulcrum, including cover cap, according to the invention.

Figure 2 illustrates on enlarged scale the three parts of a complete fulcrum according to the invention.

Figure 3 illustrates the fulcrum of Figure 2, before the cover cap is sprung into position, with the parts assembled to constitute a fulcrum of a pair of garden shears.

Figure 4 is a section on the line IV—IV of Figure 3.

Referring to Figure 1, the cutting blades 10, 11 are formed respectively as arms of two levers, the other arms of which comprise intermediate elbow portions 12, 13 and tangs 14, 15 adapted to be driven into handles 16, 17, the two levers being pivotally connected on a fulcrum 18. The handles 16 and 17 are in parallel relationship when the shears are in the closed position shown in Figure 1.

The parallel arrangement of the handles 16, 17 when the blades are closed, permitted by the elbows 12, 13, enables the tool to be operated with the operator's arms close to his body in which position more power can be exerted than when the operator's arms have to be further from the body.

As shown in Figure 2 of the drawings, the fulcrum consists of two parts 21, 22 and a cover cap 50. The part 21 comprises an annular disc 62 formed with two recesses 63 to receive a turning tool, and having a hollow neck 64 projecting upwardly from its inner circumference. A screw thread 65 of micrometric pitch is formed on the outer surface of the neck 64 and the upper edge of the neck is formed with a series of ratchet teeth 66.

The part 22 comprises an annular disc 67 having recesses 68 similar to and for the same purpose as the recesses 63, and a hollow neck depending from its inner circumference. A screw thread 70 complementary to the screw thread 65 is formed on the inner surface of the neck 69. A thin arcuate strip of spring metal 71 is secured by riveting or otherwise at one end to the top of the disc 67 and at its other end is formed with a pawl tooth 72 adapted to engage in the spaces between the ratchet teeth 66.

The cover cap 50 is channel-shaped in cross section, the inner wall 73 being formed by a depending neck and the outer wall 74 being somewhat shorter than the wall 73 and formed at its lower edge with a beading or rib 75 adapted to be sprung into an undercut portion 76 of the edge of the disc 67.

In Figures 3 and 4 the parts 21 and 22 of Figure 8 are shown assembled on opposite sides of the blades 10 and 11 of a pair of garden shears. The part 21 is disposed below the blade 11 with the neck 64 projecting upwards through the fulcrum apertures in the blades, and the neck 69 is screwed on to the neck 64. When the parts 21 and 22 are adjusted to exert the proper pressure on the blades the pawl tooth 72 is engaged between two of the teeth 66 and holds the parts in their adjusted position. The cover cap 50 is now pressed over the part 22, the cap being sufficiently elastic to permit the beading 75 to snap into the undercut recess 76 on the edge of the part 22.

The micrometric screw threads 65, 70 permit of a very fine adjustment of the joint, and in the case of garden shears and like cutting tools, the threads fix the blades firmly without "give" whilst permitting an easy sliding movement without "pinching" or "seizing." The hollow construction described reduces the weight of the tool.

What I claim is:

In a cutting tool having a pair of cutting blades, in combination, a floating fulcrum for said blades, said fulcrum comprising a first hollow tube externally provided with male micrometer threads and having a peripheral flange at one end and a continuous, circularly arranged set of spaced radial slits at the other end, whereby teeth are formed, a second hollow tube provided internally with female micrometer threads, mating with said male threads, and having a peripheral flange at one end, and a resilient arm secured to the outer face of the last-mentioned flange and adapted to be flexed toward and away from said last-mentioned flange for locking engagement with any of said teeth so as positively to prevent relative rotation of said tubes in either direction, said last-mentioned flange being formed with an annular undercut seat facing toward the flange on said first hollow tube, and including an annular cover cap adapted to overlie said last-mentioned flange and being formed with circular inner and outer axial walls to extend into said first hollow tube and around said last-mentioned flange, respectively, said circular outer wall being formed with an inwardly turned edge for resilient engagement under said seat to hold said cap on said last-mentioned flange.

JOHN SPON.

References Cited in the file of this patent

UNITED STATES PATENTS

| Number | Name | Date |
|---|---|---|
| 252,647 | Click | Jan. 24, 1882 |
| 467,130 | Finnigan | Jan. 12, 1892 |
| 710,795 | Moser | Oct. 7, 1902 |
| 756,818 | Benton | Apr. 12, 1904 |
| 793,432 | Geisel | June 27, 1905 |
| 889,966 | Rausch et al. | June 9, 1908 |
| 899,188 | Roberts | Sept. 22, 1908 |
| 1,512,662 | Atkinson et al. | Oct. 21, 1924 |
| 1,645,035 | Zeidler | Oct. 11, 1927 |
| 2,032,281 | Haywood | Feb. 25, 1936 |
| 2,348,429 | Walker | May 9, 1944 |
| 2,354,303 | Carver | July 25, 1944 |